United States Patent [19]
Glachet et al.

[11] Patent Number: 5,732,843
[45] Date of Patent: Mar. 31, 1998

[54] COVER TO BE PLACED ON A DOOR OF A RECEPTACLE TO BE STERILIZED

[75] Inventors: Charles Glachet; Jean-Pierre Simon, both of Vendome, France

[73] Assignee: La Calhene, Velizy Villacoublay, France

[21] Appl. No.: 658,755

[22] Filed: Jun. 5, 1996

[30] Foreign Application Priority Data

Jun. 8, 1995 [FR] France ................................. 95 06770

[51] Int. Cl.$^6$ ............................................. B65D 45/02
[52] U.S. Cl. .................. 220/315; 220/323; 292/256.5; 116/315
[58] Field of Search .................... 220/315, 318, 220/323, 324, 325, 327, 328; 292/256.5, 257; 116/309, 311, 312, 315, 324, 325, 326

[56] References Cited

U.S. PATENT DOCUMENTS

| | | | |
|---|---|---|---|
| 1,033,866 | 7/1912 | Blaine | 116/315 X |
| 1,861,937 | 6/1932 | Philips | 116/315 X |
| 2,861,538 | 11/1958 | Evans | 116/315 X |
| 2,866,433 | 12/1958 | Kallick et al. | 116/324 |
| 3,722,549 | 3/1973 | Wilson et al. | 292/257 X |
| 4,420,012 | 12/1983 | Astrom | 220/323 X |
| 4,467,936 | 8/1984 | Makhijani | |
| 4,627,417 | 12/1986 | Von Der Becke et al. | 220/323 X |
| 5,427,014 | 6/1995 | Von Der Becke et al. | 220/325 X |

FOREIGN PATENT DOCUMENTS

| | | |
|---|---|---|
| 140612 | 5/1985 | European Pat. Off. . |
| 546411 | 6/1993 | European Pat. Off. . |
| 1539845 | 9/1968 | France . |
| 3819247 | 12/1989 | Germany . |

*Primary Examiner*—Allan N. Shoap
*Assistant Examiner*—Nathan Newhouse
*Attorney, Agent, or Firm*—Pearne, Gordon, McCoy & Granger LLP

[57] ABSTRACT

Cover to place on a door (5) with unlocking by means of rotation as to slightly open it and making it possible to appropriately sterilize the entire inside of the receptacle it closes, whilst enabling bactericide vapors to easily reach the surfaces adjacent to the door. In order to do this, the cover includes a fixed dome portion (20) flanged on the receptacle around the door, and a handling device (40 to 42) created through the dome and able to grip the door so as to slightly lift it up without breaking its imperviousness.

7 Claims, 2 Drawing Sheets

COVER TO BE PLACED ON A DOOR OF A RECEPTACLE TO BE STERILIZED

FIELD OF THE INVENTION

The invention concerns a cover to be placed on a door of a receptacle to be sterilized.

BACKGROUND OF THE INVENTION

This receptacle is described on FIG. 1. Its shape is approximately cylindrical and its cover 1 is pierced with two outlets 2 and 3 for connecting sterilizing vapor feed pipes and to evacuate the vapor, another outlet 4 for connecting a measuring device, such as a pressure gauge, and in particular a door 5 at one extremity of the cover 1 approximately opposite the outlets 2, 3 and 4 and which shuts an opening of the cover 1 via which the receptacle can be filled or emptied. When the receptacle is examined more closely, it can be seen that the door 5 belongs to the double door family currently used to favor sealed transfers without communicating with the outside world.: the receptacle is reached by an opening closed by another door, and a glove box and coupled to this opening by means of a rotary movement. The portions in contact of the receptacle and the box are in fact fitted with locking means which are engaged, and the doors of the receptacle and the box are fitted with similar means which simultaneously are engaged. It then merely suffices to put a hand into the glove so as to reach the door of the box and unlock it by activating the door of the receptacle until the doors are disengaged from the locking means which were supporting them on the box and the receptacle respectively: the doors are then detached and the receptacle communicates with the box; the doors are replaced via a contrary movement as soon as the products have been transferred and then an unlocking movement frees the doors from each other and the receptacle from the box.

Accordingly, a recess exists on the outer face of the door 5 and flat projections or external ears 7 project slightly above the recess 6 from the edge of the latter and onto circle portions. Ears having a similar shape are introduced between the ears 7 on coupling of the receptacle to the glove box and then under said ears on rotation of the receptacle, stops (not shown) being provided to then stop continuation of rotation of the door 5 and enable it to be next driven by the door of the box.

The door 5 is mounted on a flange 8 at the end of the cover 1, this flange 8 being fitted with internal ears 9 on the internal face which are engaged with the internal ears 10 on the rear or internal face of the door 5 when coming behind it In addition, the flange 8 bears a twin-effect gasket 11, but fully known in the art, and which firstly includes a conical lip 12 to ensure imperviousness between the flange 8 and the door 5 when the latter closes the receptacle and a flat lip 13 flush with the front surface of the flange 8 and which guarantees imperviousness between the flange 8 and the wall of the glove box when the receptacle is mounted on this box and when the doors are open. Finally, outer ears 14 have been shown situated in front of the flange 8 and on its outer edge so as to be used as a device for locking the glove box.

The internal ears 9 and 10 fully cover the conical lip 12 of the twin-effect gasket 11 and the adjacent surfaces of the flange 8 and the door 5, which initially is the cause of difficulties for correctly sterilizing these portions of the inside of the receptacle. However, it is not intended to sterilize the open receptacle which, granted, would expose its entire internal surface, but would require it to be placed in a sterilizing chamber which would considerably complicate the method.

The aim of the invention is to reconcile the facility of a sterilization by the outlets 2 and 3 and the desire to carry out a complete sterilization of the interior of the receptacle. The device retained for this purpose is a movable cover which is placed on the flange 8 and makes it possible for the original and reliable gripping means to slightly open the door 5 without compromising imperviousness with the outside environment, the cover from now on needing to participate with said imperviousness.

SUMMARY OF THE INVENTION

To sum up, the invention concerns a cover to be placed on a door of a receptacle to be sterilized, the door being opened via a rotary unlocking movement, wherein said cover includes a fixed portion covering the door with a collar placed on a circular surface of the receptacle surrounding the door and fitted with a gasket touching the surface, and means for locking and tightening the collar against the surface, a wheel situated under the fixed portion and fitted with means for gearing with the door so as to make the door rotate and open it by means of translation, a rod traversing the fixed portion connected to the wheel and extended by an operating handle situated on the fixed portion, imperviousness means between the fixed portion and either the rod or the wheel, and marks for indexing the rod on translation and on rotation.

BRIEF DESCRIPTION OF THE DRAWINGS

Special means can be incorporated separately or combined with the cover so as to facilitate its usage, as shall be seen in the following detailed nonrestrictive description of the following figures.

DETAILED DESCRIPTION OF THE PREFERRED EMBODIMENTS

Figure 1:
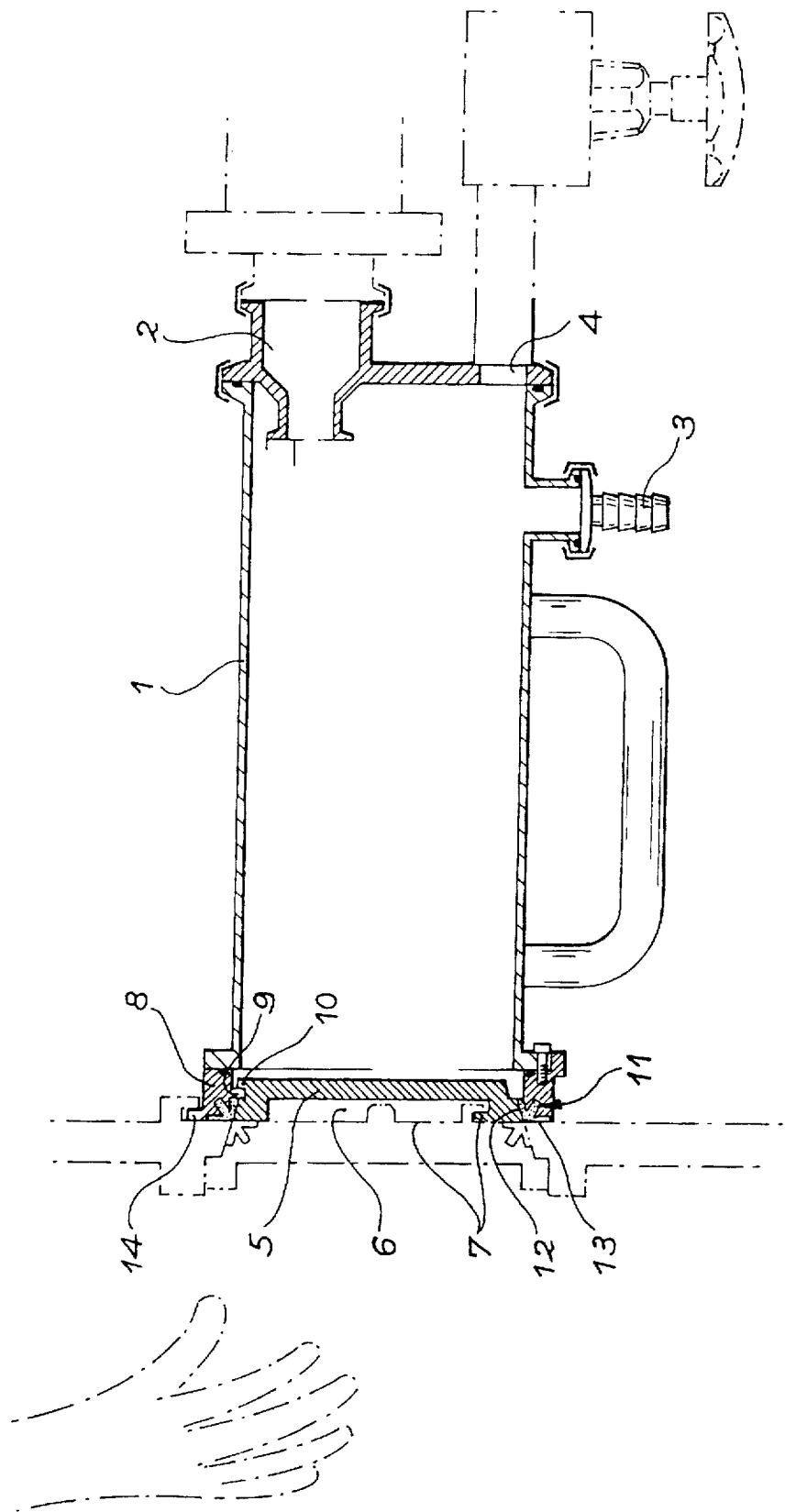
FIG. 1 (already described) shows the receptacle to be sterilized.
Figure 2:
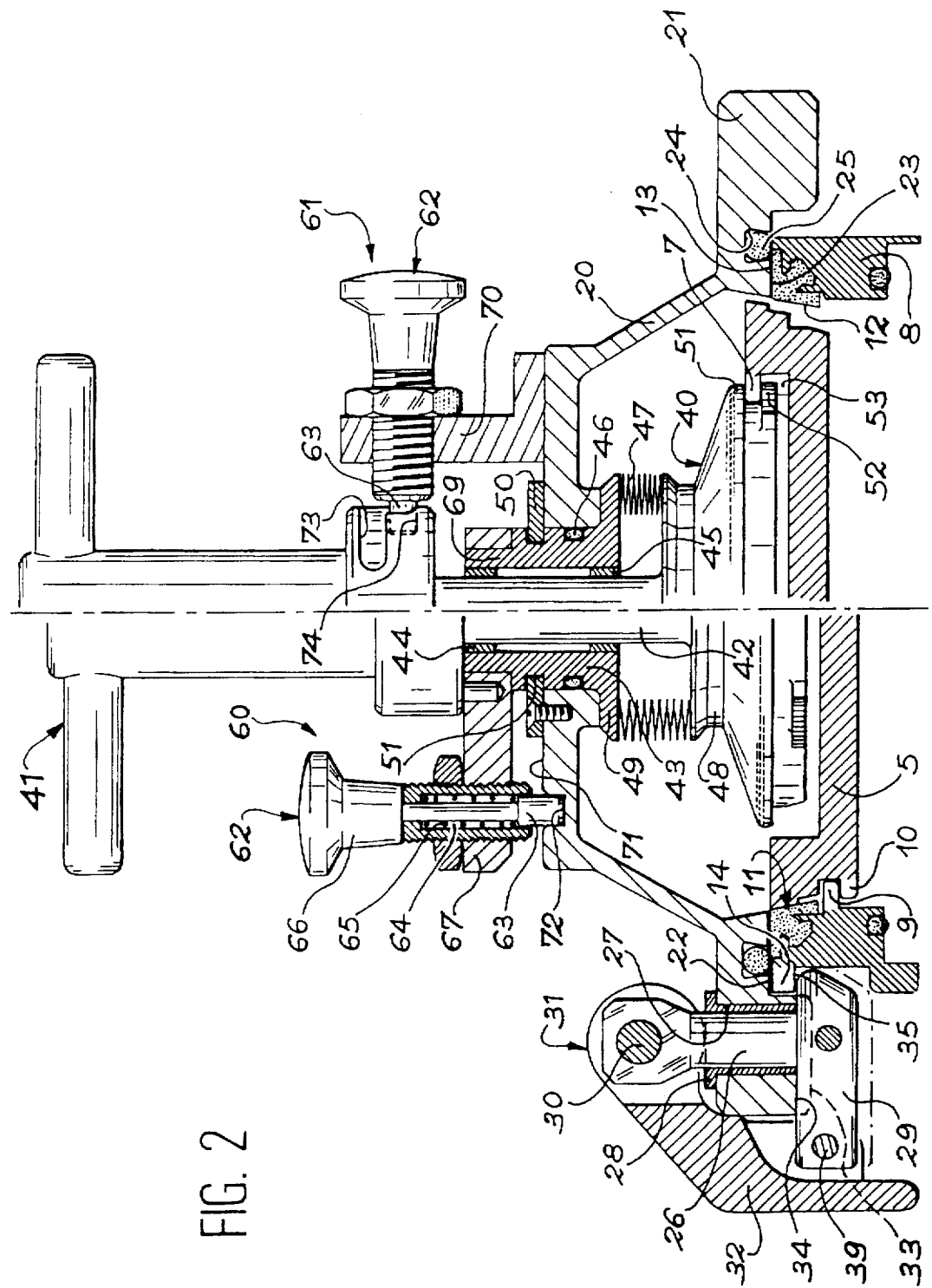
FIG. 2 is a general view of the invention.

The cover of the invention firstly includes a fixed or inert portion for covering the door 5 and its opening and which is composed of a dome 20 and a collar 21 integral with the dome 20 and which extends onto the front surface 22 of the flange 8 and external ears 14 and around this surface.

Its lower or rear face 23 which touches the front surface 22 is notched with a circular groove 24 in which a toric gasket 25 is housed. This gasket 25 is crushed against the front surface 22 and the flat lip 13 of the twin-effect joint 11 when the cover is mounted, which prohibits any outward leak between the flange 8 and the small collar 21. The device, which guarantees crushing of the joint 25 at the same time as locking of the collar 21 on the flange, includes spindles 26 provided through perforations 28 of the collar 21 and able to move freely by virtue of linings 28 which line the perforations 27. The lower extremity of the spindles 26 bears latches 29 and the upper extremity bears a pivot 30 (parallel to the collar 21 or even perpendicular to the spindle 26) around which a respective roller 31 rotates, said roller being moved out of center and integral with a handle 32. In addition, the lower face of the collar 21 is hollowed with bright grooves 33 whose bottom surfaces 34 are flush with the lower surfaces 35 of the outer ears 145 opposite the front surface 22 and extend them.

The perforations 27 opening into the grooves 33 and the latches 29 are longer and narrower than the grooves 33: they extend into the grooves 33, along them and as far as under the lower faces 35. Locking is effected by making the handles 32 tilt so as to lift up the spindles 26 by virtue of the eccentricity of the rollers 31 which roll on the upper surface of the collar 21 or, as in this instance, on an edge of the linings 28. The latches 29 are pressed against the outer ears 14 of the flange 8, compress the toric joint 25 and prevent the cover from being raised and are retained in the grooves 33. When the handles 32 are turned in the other direction, the spindles 26 slide and the latches 29 become detached from the outer ears 14, which makes it possible to free them with the cover by turning the latter so as to place the latches between the outer ears 14. Locking can be guaranteed by sliding a rod 39 into the extension perforations of each latch 29 and handle 32 pairing. After having come out of the grooves 33, it is also possible to free the latches 29 of the outer ears 14 by turning the handles 32 and the spindles 26.

The dome 20 shelters a wheel 40 manipulated by a handle 41 situated outside the cover and connected to the wheel 40 by a rod 42 which traverses the dome 20. In the embodiment shown, a ring 43 is established in the opening of the dome 20 and the rod 42 is supported by a pair of linings 44 and 45 established on the internal face of the ring 43. Imperviousness shall then be re-established by a toric joint 46 compressed between the dome 20 and the ring 43 and by bellows 47 engaged around the rod 42 and which extends between the faces opposite a shoulder 48 of the wheel 40 and a collar 49 of the ring 43 situated under the dome 20. The bellows 47 advantageously replace a toric joint between the rod 42 and the ring 43 which would then be situated between the mobile elements and likely to be damaged or moved quickly.

The ring 43 is retained by a collar 50 screwed into the dome 20 and formed of two halves engaged in a throat 51 established on its outer surface. In addition, the collar 49 abuts against the dome 20.

The wheel 40 is fitted with a border 51 able to be laid on the outer ears 7 of the door 5 and with ears 52 situated at a certain distance under the border 51 and able to be slid between the outer ears 7 of the door 5 and under them following a rotary movement. On continuing this movement, the ears 52 are engaged against the stops 53 of the door 5 which they drive in rotation until the internal ears 9 and 10 come apart. The door 5 can then be opened by means of traction on the handle 41; the corresponding state has been shown on the right half of the figure. It can be observed that the conical lip 12 of the twin-effect joint 11 and the adjacent surfaces of the flange 8 and door 5 are fully exposed to the sterilizing vapors which also pass into the dome 20 and are outwardly stopped by the joints 25 and 46 and the bellows 47. An opposite translation movement driving in the wheel, as shown on the left portion of the figure, replaces the door 5 on the twin-effect joint 11 and an opposite movement of rotation locks the door 5 on the flange 8 and then frees the ears 7 and 52 and the cover shall be withdrawn with the cover 40 without opening the door 5.

The movements of the wheel 490 are however effected blind and shows the need to make use of indexing marks so as to guarantee the correct carrying out of the movements with the desired quantities. In fact, there are two indexing systems, one on rotation 60 and one on translation 61, each including an index constructed in the same way: a finger 63 slides into a bush 64 and is pushed back by a spring 65 towards an opposing notched surface. However, a control handle 66 is integral with the finger 63 so as to pull it against the action of the spring 65.

The bushes 64 are threaded, the first being engaged in a shelf 67 integral with the handle 41 by a pin 68 whilst being adjusted around an upper circular portion 69 of the ring 43 so as to enable it to rotate, the second being engaged in a rib 70 integral with the dome 20.

The finger 63 of the rotation indexing system 60 rubs against a top face 71 of the dome 20 and can be driven into two holes 72 which have been fitted to mark the extreme rotation travels and materialize the correct driving in position of the wheel 40 (when the ears extend between the outer ears 7) and the position corresponding to locking of the door 5 on the wheel 40 and unlocking of the flange 8. Only one of these holes 72 is shown. During this time, the finger 63 of the other index 62 has rotated into a groove 73 which indicates the proper depth of the wheel 40 for this operation. But when the wheel 40 needs to be lifted up to slightly open the door 5, the finger 63 is made to penetrate into a hole 74 communicating with the groove 73. The wheel 40 is again driven in by pulling on the control lever 61 so as to free the finger 63 from the hole 74.

What is claimed is:

1. Cover to be placed on a door of a receptacle to be sterilized, the door being opened by a rotary unlocking movement, wherein it includes a fixed portion covering the door and having a collar laid on a circular surface of the receptacle surrounding the door and fitted with a gasket for touching the surface and means for locking and clamping the collar against the surface, a wheel situated under the fixed portion and fitted with means for engaging with the door so as to make the door rotate and open it by means of translation, a rod traversing the fixed portion connected to the wheel and extended by a control handle situated on the fixed portion, sealing means between the fixed portion and one of the rod and the wheel, and marks for indexing the rod on translation and on rotation.

2. Cover according to claim 1, wherein the sealing means include bellows surrounding the rod and disposed between the wheel and the fixed portion.

3. Cover according to claim 2, wherein linings are disposed between the rod and the fixed portion.

4. Cover according to claim 1, wherein the locking and tightening means include a bottom surface of the collar surrounding an edge of the receptacle opposite the circular surface, the edge being flush with the bottom surface, perforations provided through the collar and opening on the bottom surface, spindles disposed so as to move freely in the perforations, latches attached to the spindles extending beyond the bottom surface and onto the edge, and traction devices of the spindles tending to come near the latches of the bottom surface.

5. Cover according to claim 4, wherein the traction devices consist of rollers rotating to move out of center around pivots of the spindles and onto the collar, the pivots being parallel to the collar and perpendicular to the spindles, and handles integral with the rollers.

6. Cover according to claim 4, wherein the bottom surface is a bottom surface with bright grooves wider than the latches and recessed in the small collar.

7. Cover according to claim 1, wherein the indexing marks include fingers propelled by springs against surfaces fitted with recesses corresponding to the desired extreme positions for movement of the wheel, and control levers for retracting the fingers against the springs.

* * * * *